United States Patent [19]

Ozawa

[11] Patent Number: 4,583,723
[45] Date of Patent: Apr. 22, 1986

[54] ELASTICALLY DAMPING DEVICE FOR SUSPENSION OF ENGINE

[75] Inventor: Isao Ozawa, Inazawa, Japan

[73] Assignee: Toyoda Gosei Co., Ltd., Aichi, Japan

[21] Appl. No.: 618,352

[22] Filed: Jun. 7, 1984

[30] Foreign Application Priority Data

| Jun. 10, 1983 | [JP] | Japan | 58-104610 |
| Jun. 10, 1983 | [JP] | Japan | 58-104611 |
| Jun. 10, 1983 | [JP] | Japan | 58-104612 |
| Sep. 16, 1983 | [JP] | Japan | 58-171556 |
| Sep. 19, 1983 | [JP] | Japan | 58-172617 |

[51] Int. Cl.⁴ .................................... F16M 5/00
[52] U.S. Cl. .................... 267/140.1; 188/267; 248/562
[58] Field of Search .......... 188/267, 279, 161; 267/8 R, 35, 63 R, 113, 136, 140.1, 140.3, 141, 141.4; 180/300; 248/562, 636, 550, 566

[56] References Cited

U.S. PATENT DOCUMENTS

| 3,006,656 | 10/1961 | Schaub | 188/267 X |
| 4,159,091 | 6/1979 | Le Salver et al. | 248/562 |
| 4,469,316 | 9/1984 | van den Boom et al. | 267/140.1 |

FOREIGN PATENT DOCUMENTS

| 1101667 | 10/1955 | France | 188/267 |
| 0129944 | 8/1982 | Japan | 267/140.1 |
| 0037337 | 3/1983 | Japan | 267/140.1 |

Primary Examiner—Bruce H. Stoner, Jr.
Assistant Examiner—Robert J. Oberleitner
Attorney, Agent, or Firm—Cushman, Darby & Cushman

[57] ABSTRACT

An elastically damping device for the suspension of an engine of a vehicle, by which the engine vibrations are prevented from being transmitted to the body of the vehicle, is disclosed. The damping device is provided with a first fluid chamber and a second fluid chamber, each of which is defined by an elastically deformable wall. The fluid chambers are separated from each other by means of a partition plate, of which at least one portion is formed into a movable plate being movable in such a direction as to lower the increased inner pressure of the fluid chambers, and which has a restricted passageway for communicating the fluid chambers. The damping device of the present invention further comprises two stopper portions for stopping the movement of the movable plate and an electromagnetic coil for operating one or two stopper portions so as to control the movable distance of the movable plate in accordance with the driving condition of the vehicle. The electromagnetic coil operates the stopper portions to make the movable distance of the movable plate small at both of an engine starting time and a vehicle running time and to make the movable distance of the movable plate large at an engine idling time.

12 Claims, 8 Drawing Figures

ELASTICALLY DAMPING DEVICE FOR SUSPENSION OF ENGINE

BACKGROUND OF THE INVENTION

The present invention relates to an elastically damping device which is employed in an engine mount of a vehicle.

The elastically damping device comprises a first and a second fluid chambers, which are separated by a partition plate from each other and each of which is defined by an elastically deformable wall. These fluid chambers communicate with each other by way of a restricted passage provided in the partition plate while at least one of these chambers is connected to an engine.

When the engine is started, the vibrations of the engine are transmitted to the fluid chamber to deform the fluid chamber. Due to the increment in inner pressure of the fluid chamber caused by the deformation thereof, the fluid flows from one fluid chamber to the other chamber through the restricted passage at high speed. At this time, the fluid receives a large resistance so that vibrations of low frequency and large amplitude such as cranking vibrations occurring at an engine starting time and shake vibrations occurring while the vehicle is running, can be effectively damped.

While the engine is operated, there occur vibrations of high frequency, of which the frequency is not less than that of idling vibrations and the amplitude is smaller than that of the above described cranking vibrations and the shake vibrations. Such vibrations of high frequency and small amplitude must be not damped but isolated.

For that purpose, the conventional device has adopted such a structure that the whole or one portion of the above described partition plate is provided so as to be movable by a predetermined distance so as to lower the increment in inner pressure of the fluid chamber.

However, the amplitude of the idling vibrations is comparatively larger than that of the vibrations of high frequency, which occur while the vehicle is running. Therefore, when the movable distance of the partition plate is made large so as to isolate the idling vibrations, there occurs the problem that the cranking vibrations and the shake vibrations are not sufficiently damped.

SUMMARY OF THE INVENTION

One object of the present invention is to provide an elastically damping device by which the vibrations of the engine, occurring over the wide range of the engine driving condition from the engine starting time to the vehicle running condition, are effectively prevented from being transmitted to the vehicle body.

Another object of the present invention is to provide an elastically damping device by which the vibrations of low frequency and large amplitude can be properly damped while the vibrations of high frequency and small amplitude can be properly isolated.

Still another object of the present invention is to provide an elastically damping device having a partition plate of which the movable distance is changeable in accordance with the driving condition of the engine.

The elastically damping device of the present invention comprises a first fluid chamber and a second fluid chamber, each of which is defined by a rubber elastic body and which are separated from each other by a partition member, and a passageway which is formed in the partition member for communicating the first and the second fluid chambers.

At least one portion of the partition member is formed into a movable plate which is movable in such a direction as to lower the increased inner pressure of the fluid chambers.

The damping device of the present invention further comprises stopping means for stopping the movement of the movable plate and control means for operating the stopping means so as to control the movable distance of the movable plate in accordance with the driving condition of the vehicle.

The control means operates the stopping means to make the movable distance of the movable plate small at an engine starting time and at a vehicle running time and to make the movable distance of the movable plate large at an engine idling time.

BRIEF DESCRIPTION OF THE DRAWINGS

FIG. 3 is a sectional view of the device;

FIG. 4 is a plan view of the device;

FIG. 5 is a sectional view of the device taken along the line V—V of FIG. 6;

FIG. 6 is a plan view of the device;

DETAILED DESCRIPTION OF THE EMBODIMENTS

Figure 1:
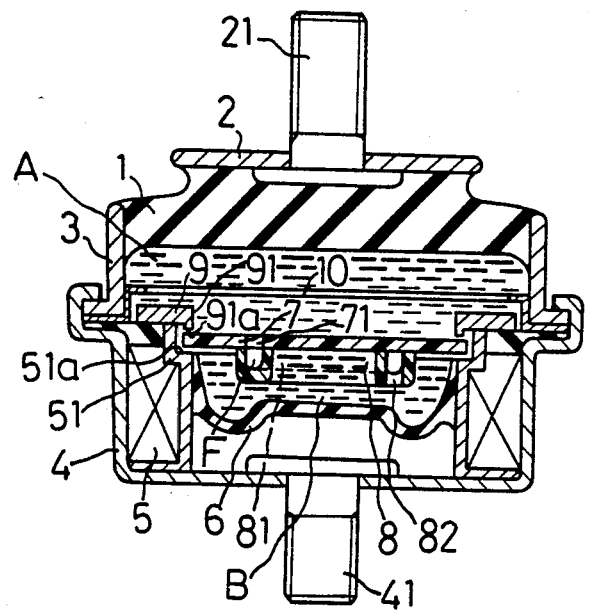
FIG. 1 is a sectional view of a first embodiment of the elastically damping device according to the present invention.

FIG. 1 shows a first embodiment of the present invention. In FIG. 1, an upper plate 2 is joined to a thick rubber elastic wall 1 which receives the load of an engine. The engine is fixed to the upper plate 2 by means of a bolt 21.

A cylindrical side plate 3 is joined to the outer periphery of the elastic wall 1. The side plate 3 is supported by a cup-shaped bottom plate 4. The lower portion of the side plate 3 is fixed to the opening of the bottom plate 4 by caulking. Within the bottom plate 4, an annular electromagnetic coil 5 acting as a control means is disposed along the side wall thereof. To the inner surface of the electromagnetic coil 5, the outer periphery of a thin rubber elastic sheet 6 is joined.

The upper portion of the inner periphery of the electromagnetic coil 5 is formed into a stepped portion 51. A circular partition plate 7 is disposed over the stepped portion 51 so that the outer periphery thereof is opposite to the stepped portion 51 at a predetermined distance. The partition plate 7 separates a first fluid chamber A defined by the elastic wall 1 from a second fluid chamber B defined by the elastic sheet 6. To the under surface of the partition plate 7, a semi-annular member 8 having a letter-U shaped cross section is joined. The under surface of the partition plate 7 and the semi-annular member 8 define a passageway 81. One end opening of the passageway 81 communicate with a through hole 71 formed in the partition plate 7 while the other end opening communicate with a through hole 82 formed in the member 8. The through hole 71, the passageway 81, and the through hole 82 compose a restricted passageway F through which the fluid flows from the first fluid chamber A to the second fluid chamber B, or vice versa.

Over the electromagnetic coil 5, an annular stopper plate 9 is disposed so as to move upwardly and downwardly. The stopper plate 9 is made of a magnetic body. When the electromagnetic force of the electromagnetic coil 5 is applied to the stopper plate 9, the stopper plate 9 is attracted by the coil 5 to be strongly adhered to the upper end surface thereof. From the inner periphery of the stopper plate 9, a flange portion 91 projects downwardly.

The under surface 91a of the flange portion 91, which acts as one stopper portion, is opposed to the partition plate 7. The upward movement of the partition plate 7 is stopped by the under surface 91a of the stopper plate 9, while the downward movement thereof is stopped by the upper surface 51a of the stepped portion 51 of the electromagnetic coil 5, which acts as the other stopper portion.

Over the stopper plate 9, a stopper ring 10 provided with an engaging portion having a letter-L shaped cross section is disposed for stopping the upward movement of the stopper plate 9.

At a center of the bottom surface of the bottom plate 4, a bolt 41 is provided so as to extend downwardly. By means of the bolt 41, the whole device is fixed to the vehicle body. The supply of the electric current to the electromagnetic coil 5 is controlled by an engine speed detecting device (not shown).

In operation, at an engine starting time, an electric current is supplied to the electromagnetic coil 5. The stopper plate 9 is attracted by the electromagnetic force of the electromagnetic coil 5 and strongly adhered to the upper end surface thereof as shown in FIG. 1. When the device receives the vibrations of large amplitude occurring due to the cranking of the engine, the rubber elastic wall deforms to increase the inner pressure of the first fluid chamber A. The increase in inner pressure cannot be lowered only by moving the partition plate 7 upwardly and downwardly. As a result, fluid flows through the restricted passageway F at high speed. At this time, the fluid receives a large flowing resistance so that vibrations of large amplitude can be rapidly damped.

At an engine idling time, an electric current is not supplied to the electromagnetic coil 5. As a result, the stopper plate 9 becomes free from the electromagnetic coil 5 and freely moves upwardly and downwardly with the partition plate 7 until it comes in contact with the stopper ring 10. Therefore, at an engine idling time, the movable distance of the partition plate 7 becomes larger than that at an engine cranking time.

Since the amplitude of the vibrations occurring at an engine idling time, is small as compared with that of the vibrations occurring at an engine cranking time, the increment in inner pressure of the first fluid chamber A can be prevented only by the movement of the partition plate 7 so that such vibrations of the engine is rapidly isolated.

At a time when the engine rotates at high speed, an electric current restarts to be supplied to the electromagnetic coil 5.

Since the amplitude of the vibrations occurring at this time is much smaller as compared with that of the vibrations occurring at an engine idling time, the increment in inner pressure of the first fluid chamber A can be sufficiently prevented only by the movement of the partition plate 7 despite of a small movable distance. As a result, such vibrations are isolated.

However, when the vibrations of large amplitude, such as shake vibrations, occur while the engine rotates at high speed, the increment in inner pressure of the first fluid chamber A cannot be prevented by the movement of the partition plate 7. The pressurized fluid flows through the restricted passage F to receive a large flowing resistance so that such vibrations are rapidly damped.

As described above, according to the present invention, by controlling the movable distance of the partition plate provided with a restricted passageway through which the fluid flows in accordance with the engine speed, the vibrations of the engine which rotates at various speed from a low speed to a high speed can be effectively prevented from being transmitted to the vehicle body.

Figure 2:
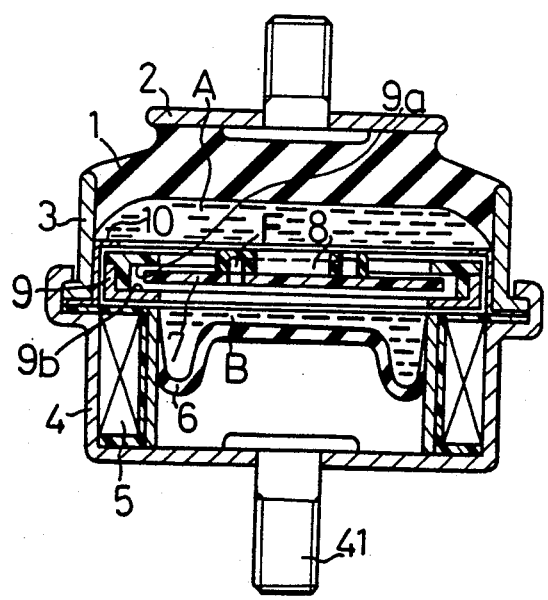
FIG. 2 is a sectional view of a second embodiment of the elastically damping device according to the present invention.

FIG. 2 shows a second embodiment of the present invention. Over the electromagnetic coil 5, an annular casing 9 acting as a stopping means, is disposed. The casing 9 can move upwardly and downwardly between the upper end surface of the electromagnetic coil 5 and the stopper ring 10 along the side plate 3. The lower portion of the casing 9 is made of a magnetic body.

Within the casing 9, a partition plate 7 is disposed. The outer periphery of the partition plate 7 is opposed to the upper inner surface 9a and the lower inner surface 9b. Therefore, the movable distance of the partition plate 7 is determined by the upper inner surface 9a and the lower inner surface 9b of the casing 9.

A semi-annular member 8 having a letter-U shaped cross section is joined to the upper surface of the partition plate 7 to form a restricted passageway F communicating the first fluid chamber A with the second fluid chamber B. The other construction of the second embodiment is similar to that of the first embodiment.

In operation, at an engine starting time, an electric current is supplied to the electromagnetic coil 5. The casing 9 is attracted by the coil 5 and is adhered thereto. Since the amplitude of the vibrations occurring at this time so large that the increment in inner pressure of the first fluid chamber A cannot be lowered only by the movement of the partition plate 7.

The pressurized fluid flows through the restricted passageway F from the first fluid chamber A to the second fluid chamber B to receive a large flowing resistance so that such vibrations are largely damped.

At an idling time, an electric current is stopped from being supplied to the electromagnetic coil 5. So the casing 9 freely moves upwardly and downwardly. Therefore, the movable distance of the partition plate 7 becomes large. As a result, the idling vibrations of small amplitude can be effectively isolated.

When the vehicle starts to run, an electric current is supplied to the electromagnetic coil 5 again. The vibrations of high frequency, of which the amplitude is smaller than that of the idling vibrations, can be sufficiently isolated by means of the partition plate 7 which is movable by a predetermined distance.

When the device receives the vibrations of large amplitude, such as the shake vibrations while the vehicle is running, the fluid flows through the restricted passageway F so that such vibrations are effectively damped.

Figure 3:
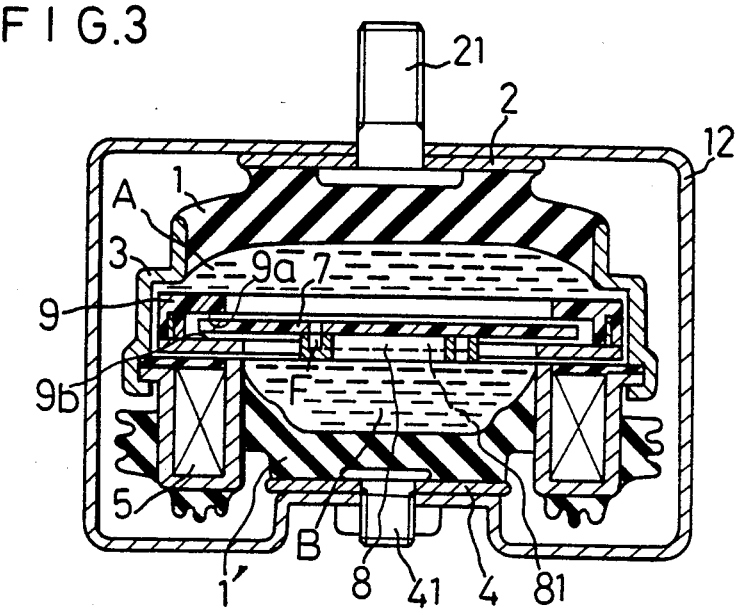
FIGS. 3, 4 show a third embodiment of the present invention.
Figure 4:
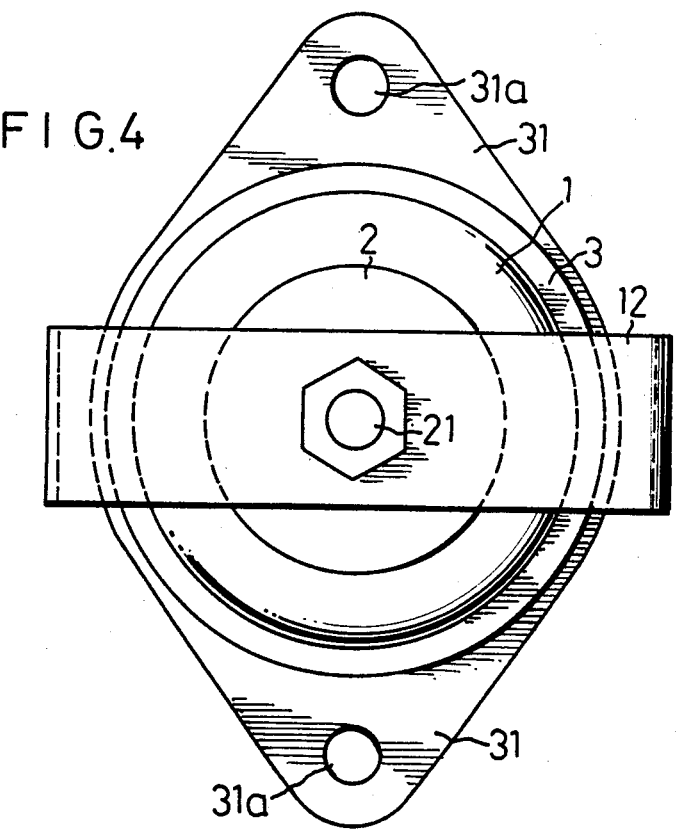

FIGS. 3 and 4 show a third embodiment of the present invention.

FIG. 3 is a sectional view of the whole device and FIG. 4 is a top plan view thereof.

Thick rubber elastic walls 1, 1' are disposed so as to be opposed to each other. The rubber elastic wall 1 defines a first fluid chamber A while the rubber elastic wall 1' defines a second fluid chamber B.

A bottom plate 4 is joined to the bottom surface of the central portion of the rubber elastic wall 1'. The bottom plate 4 is provided with a bolt 41 at its center. An electromagnetic coil 5 is embedded in the outer peripheral portion of the rubber elastic wall 1'.

An upper plate 2 is joined to the upper surface of the central portion of the rubber elastic wall 1. The upper plate 2 is provided with a bolt 21 at its center.

The upper open end of a cylindrical side plate 3 is joined to the outer periphery of the rubber elastic wall 1 while the lower open end of the side plate 3 is fixed to the electromagnetic coil 5 embedded in the rubber elastic wall 1' by caulking.

As shown in FIG. 4, the side plate 3 is provided with two flange portions 31 at radially symmetric positions, each of which extends in a horizontal direction. Each of the flange portions 31 is provided with a through hole 31a.

Within the closed enclosure formed by the elastic walls 1, 1', an annular casing 9 is disposed. A partition plate 7 is disposed within the casing 9 to divide the enclosure into the first fluid chamber A and the second fluid chamber B.

The casing 9 is movable upwardly and downwardly between the upper end surface of the electromagnetic coil 5 and the stepped portion of the side plate 3 along the side plate 3. The lower portion of the casing 9 is made of a magnetic body.

The bottom plate 4 and the upper plate 2 are integrally connected to each other by means of a supporting plate 12. And the engine is fixed to the damping device by means of the bolt 21 provided in the upper plate 2 while the damping device is fixed to the vehicle body by inserting a bolt (not shown) into the through holes 31a of the flange portions 31 of the side palte 3.

In operation, when the damping device having the above described structure receives vibrations, the first fluid chamber A or the second fluid chamber B contracts to increase the inner pressure thereof while the other fluid chamber expands to lower the inner pressure thereof. The alternate expansion and contraction of two fluid chambers are alternately repeated. Due to the difference in inner pressure between two fluid chambers A, B, the fluid flows through the restricted passageway F from the contracted fluid chamber to the expanded fluid chamber.

The third embodiment achieves the same effects as those of the second embodiment. In addition, since the fluid chambers A, B are formed by thick rubber elastic bodies so as to expand and contract alternately, vibrations of large amplitude can be effectively damped.

Figure 5:
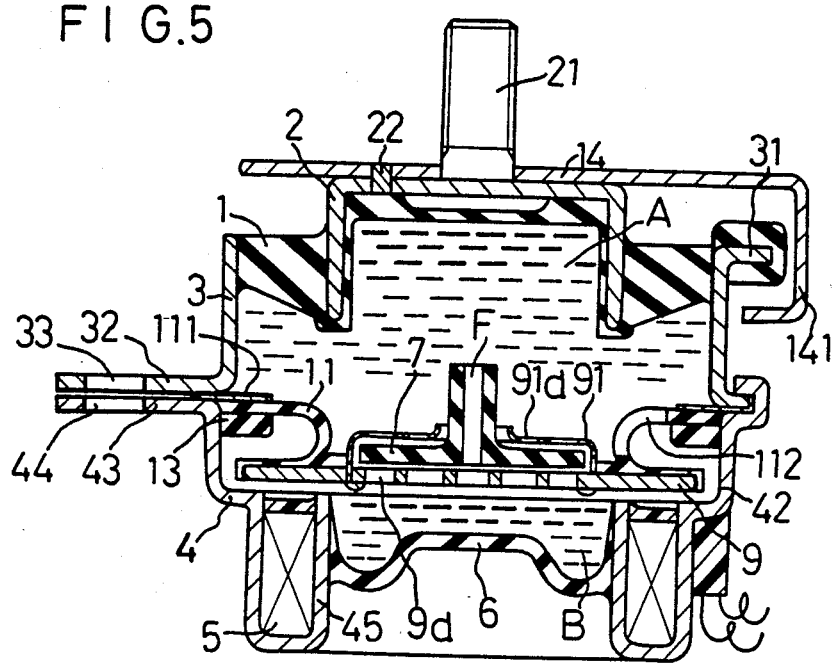
FIGS. 5, 6 show a fourth embodiment of the present invention.
Figure 6:
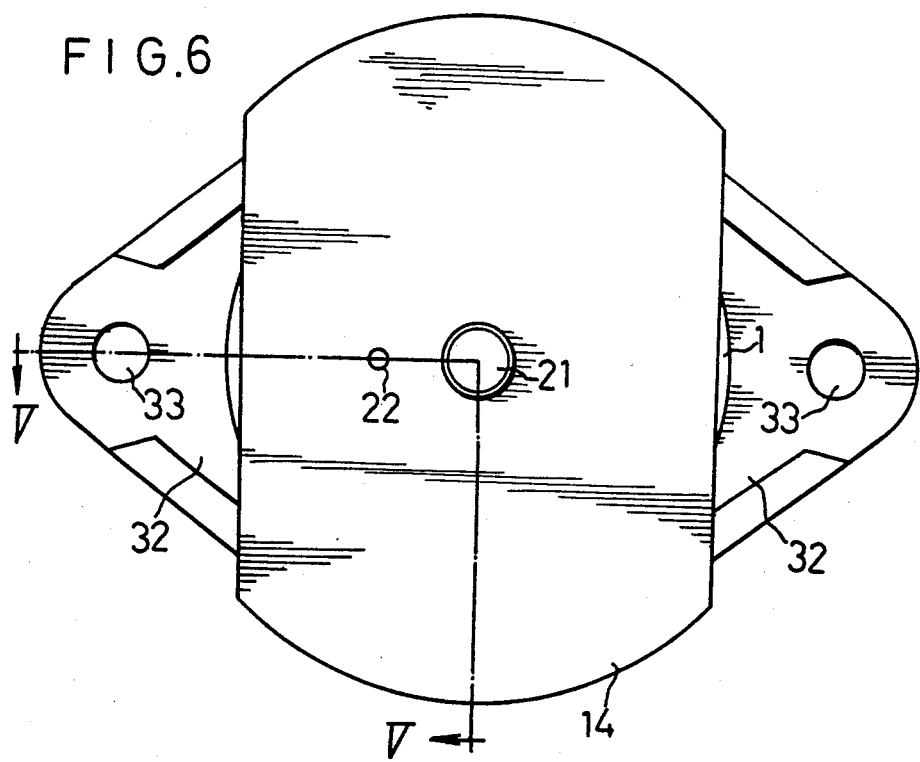

FIGS. 5, 6 illustrate a fourth embodiment of the present invention.

In FIGS. 5, 6, a upper plate 2 is embedded in the central portion of the thick rubber elastic wall 1. A side plate 3 is joined to the outer periphery of the wall 1.

A cylindrical bottom plate 4 is disposed under the side plate 3. The lower end of the side plate 3 and the upper end of the bottom plate 4 are connected to each other by caulking. The lower portion of the bottom plate 4 is bent inwardly to from a bent portion 45 having a U-shaped cross section. An annular electromagnetic coil 5 is accomodated within the bent portion 45. A thin rubber elastic sheet 6 is provided within the inner cavity defined by the bent portion 45 so as to divide the cavity to an upper and a lower portions. The upper portion of the cavity acts as the second fluid chamber B.

A stopper plate 9 made of a magnetic body, acting as one of the stopping portions, is disposed within the cylindrical wall 42 of the bottom plate 4. A rubber elastic sheet 11 is joined to the outer peripheral surface of the stopper plate 9 while the outer peripheral edge of the elastic sheet 11 is sandwiched between the caulked side plate 3 and the bottom plate 4 and is fixed thereto through a ring plate 111. The stopper plate 9 is horizontally retained without swinging right and left while freely moving upwardly and downwardly. The rubber elastic sheet 11 is provided with a plurality of slits 112 through which the fluid freely flows. A stopper member 13 projects from the cylindrical wall 42 of the bottom plate 4 for blocking the stopper plate 9 from moving upwardly.

The stopper plate 9 is provided with a cover member 91 having a large number of open passages 91d, which acts as the other stopper portion. A plurality of lower end portions of the cover member 91 are inserted into through holes of the stopper plate 9 and fixed thereto by caulking.

A circular partition plate 7 is disposed within the cover member 91. The central portion of the partition plate 7, which projects upwardly, is provided with a restricted passageway F. A large number of passages 9d are formed in the stopper plate 9 under the partition plate 7.

The engine is disposed on the upper plate 2 and fixed thereto by the bolt 21 and a blocking plate 14 is fitted by the bolt 21. One pair of opposed sides of the blocking plate 14 are bent downwardly to form bent portions 141. The upward and downward movement of the upper plate 2 occurring due to engine vibrations is blocked when the bent portions 141 come into contact with the bent portions 31 which are formed in the upper end of the side plate 3.

The blocking plate 14 is prevented from turning by means of a pin 22 provided in the upper plate 2.

The damping device of the fourth embodiment is fixed to the vehicle body by inserting a bolt into holes 33 44 which are formed in the flange portion 32 of the side plate 3 and the flange portion 43 of the bottom plate 4, respectively.

The fourth embodiment has the same operation effect as that of the first embodiment. In addition, since the stopper plate 9 is supported by the bottom plate 4 through the rubber elastic sheet 11, the stopper plate 9 is horizontally retained without swinging right and left so that noise and damage of the device which occur due to the contact of the outer periphery of the stopper plate 9 with the wall 42 of the bottom plate 4, can be prevented. Therefore, the stopper plate 9 can move upwards and downwards smoothly.

Figure 7:
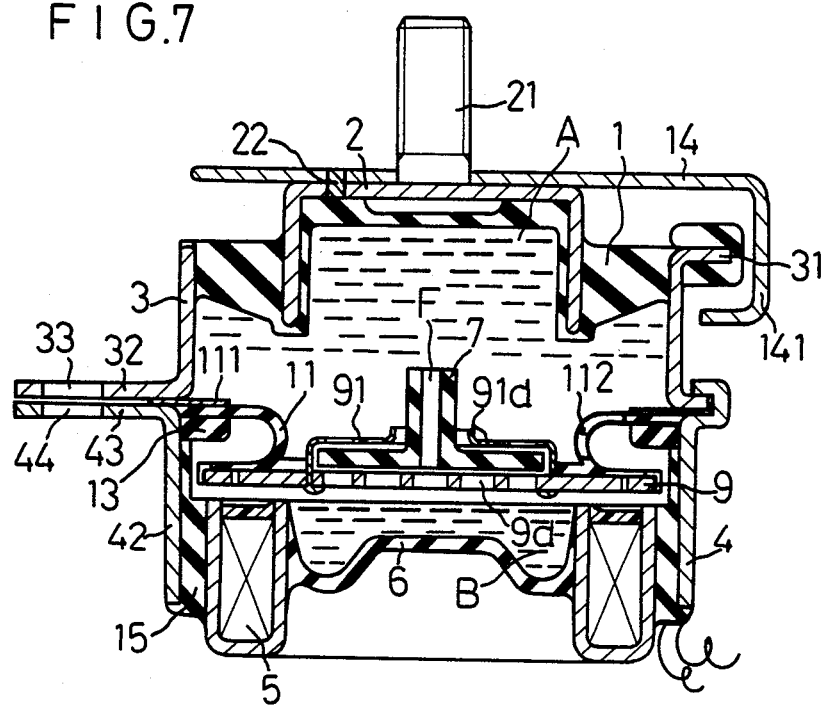
FIG. 7 is a sectional view of a fifth embodiment of the device according to the present invention.

FIG. 7 illustrates a fifth embodiment of the damping device according to the present invention.

A rubber member 15 having a predetermined spring constant is joined to the outer periphery of the annular electromagnetic coil 5 which is disposed under the stopper plate 9. The outer periphery of the rubber member 15 is joined to the cylindrical wall 42 of the bottom plate 4. Thus, a dynamic damper having a predetermined natural frequency, which is determined by the mass of the electromagnetic coil 5 and the spring constant of the rubber member 15, is formed. The movable distance of the partition plate 7, namely the distance between the stopper plate 9 and the cover member 91 is made smaller than that of the fourth embodiment.

The other structure of the fifth embodiment is substantially equal to that of the fourth embodiment.

In the fifth embodiment, vibrations of comparatively large amplitude out of the vibrations of high frequency which occur while the vehicle is running can be effectively prevented from being transmitted to the vehicle body by the antiresonance action of the dynamic damper composed of the electromagnetic coil 5 and the rubber member 15.

And by means of the partition plate 7 of which the movable distance is made smaller than that of the preceding embodiments, vibrations of comparatively smaller amplitude out of the vibrations of high frequency can be sufficiently isolated.

Therefore, by the device of the fifth embodiment, vibrations of high frequency can be prevented from being transmitted to the vehicle body.

When the vibrations of large amplitude such as cranking vibrations and shake vibrations are applied to the device of the fifth embodiment while the vehicle is running, since the movable distance of the partition plate 7 is made small, the partition plate 7 immediately comes in contact with the cover member 91 or the stopper plate 9. The inner pressure of the first fluid chamber A rapidly increases so that the pressurized fluid flows from the first fluid chamber A to the second fluid chamber B through the restricted passageway F at high speed.

Therefore, according to the fifth embodiment, such vibrations of large amplitude occurring while the vehicle is running can be effectively damped as compared with the preceding embodiments.

Figure 8:
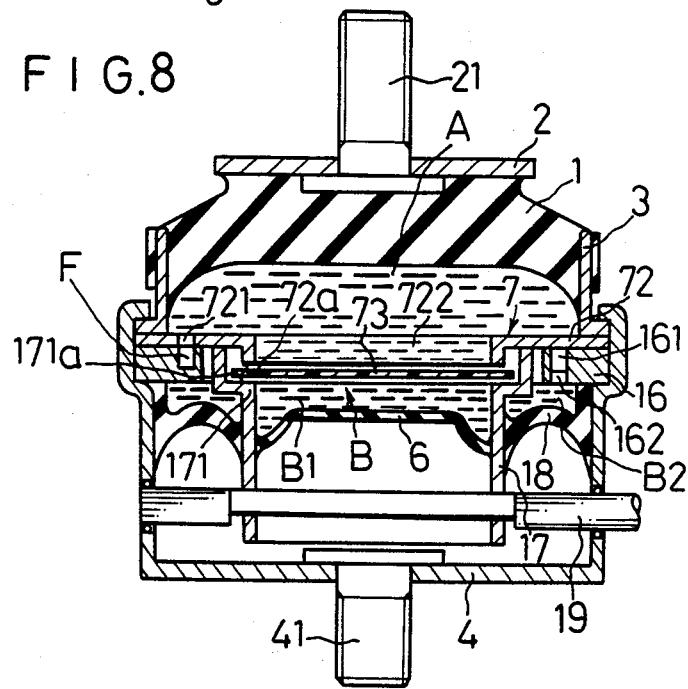
FIG. 8 is a sectional view of a sixth embodiment of the device according to the present invention.

FIG. 8 illustrates a sixth embodiment of the damping device according to the present invention.

The outer peripheral portion of the partition plate 7 is formed into a fixing plate 72. A ring member 16 is disposed in contact with the under surface of the fixing plate 72. A groove 161 is formed in the upper surface of the ring member 16 along the semicircumference thereof. One open end of the groove 161 communicates with the through holes 721 provided in the fixing plate 72 while the other open end thereof communicates with the through hole 162 provided in the ring member 16. The through hole 721, the groove 161 and the through hole 162 form a restricted passageway F.

The side plate 3, the fixing plate 72 and the ring member 16 are supported by the bottom plate 4 and are fixed to the open end portion of the bottom plate 4 by caulking.

A cylindrical body 17 is disposed within the bottom plate 4. A freely deformable rubber elastic sheet 6 is provided within the cylindrical body 17 to divide the cavity therewithin into an upper cavity and a lower cavity. A thick rubber elastic sheet 18 having rigidity is stretched between the outer surface of the cylindrical body 17 and the inner surface of the bottom plate 4.

The second fluid chamber B is divided into a first portion $B_1$ defined by the thin rubber elastic sheet 6 and a second portion $B_2$ defined by the thick rubber elastic sheet 18.

The cylindrical body 17 is provided with a stepped portion 171 in its upper open end portion. A movable plate 73 composing the partition plate 7 is disposed between the stepped portion 171 and the fixing plate 72. The movable plate 73 covers the opening 722 of the partition plate 7 and the opening of the cylindrical body 17 and is movable upwardly and downwardly. The upward and downward movement of the movable plate 73 is blocked when the outer periphery of the movable plate 73 comes into contact with the under surface 72a of the partition plate 7 or the upper surface 171a of the stepped portion 171. The under surface 72a and the upper surface 171a act as the stopper portions.

A shaft 19 is supported by the side wall of the bottom plate 4 while passing the cavity defined thereby. The central portion of the shaft 19 has a smaller diameter as compared with the end portions thereof and is eccentric with respect to the end portions. The central portion penetrates the cylindrical wall of the cylindrical body 17. As the shaft 19 rotates, the central portion eccentrically rotates to move the cylindrical body 17 upwardly and downwardly. At the uppermost position of the cylindrical body 17 as shown in FIG. 8, the upper end of the cylindrical body 17 is in contact with the under surface of the fixing plate 72 and the distance between the under surface 72a of the partition plate 7 and the upper surface 171a of the stepped portion 171 becomes small so that the movable distance of the movable plate 73 is made small.

One end of the shaft 19 extends out of the bottom plate 4 and is connected to a driving device (not shown) which is controlled by means of an engine speed detecting device. The damping device of the sixth embodiment is fixed to the vehicle body by means of a bolt 41 which is provided in the bottom plate 4.

At an engine starting time, the shaft 19 is rotated to lift up the cylindrical body 17 as shown in FIG. 8.

When cranking vibrations of large amplitude occurs in the above condition, the first fluid chamber A largely deforms so that the inner pressure thereof is largely increased. The increment in inner pressure is not lowered by means of the movable plate 73 since the movement is blocked by the surfaces 72a, 171a which are opposed to each other at a small distance.

As a result, the fluid within the first fluid chamber A flows into the second portion $B_2$ of the second fluid chamber B through the restricted passageway F to receive a large flowing resistance so that cranking vibrations are rapidly damped.

Namely, when the first fluid chamber A contracts, the fluid flows from the first fluid chamber A to the second portion $B_2$ of the second fluid chamber B through the restricted passageway F at high speed. Dut to a large flowing resistance occurring at this time, vibration can be effectively damped.

Since the second portion $B_2$ is defined by the thick rubber elastic sheet 18 having rigidity, the inner pressure of the second portion $B_2$ is increased when the fluid flows into the second portion $B_2$. Therefore, when the first fluid chamber A expands, the fluid returns from the pressurized second portion $B_2$ to the first fluid chamber A at high speed, passing through the restricted passageway F so that vibrations can be effectively damped.

In addition, when the first fluid chamber A contracts, the fluid flows into the second portion $B_2$ to increase the inner pressure thereof. Therefore, the inner pressure of the first fluid chamber A is maintained high to increase spring force of the damping device. As a result, vibrations can be effectively damped. At an engine idling time, the shaft 19 is rotated furthermore, to lift down the cylindrical body 17 so that the distance between the surfaces 72a and the 171a becomes large. As a result, the movable distance of the movable plate 73 becomes large.

The amplitude of engine vibrations occurring at an engine idling time is smaller than that of cranking vibrations. At an engine idling time, idling vibrations deform the first fluid chamber A. However, the increment in inner pressure of the first fluid chamber A is prevented by the movement of the movable plate 73. As a result, such idling vibrations can be rapidly isolated.

When the engine rotates at high speed, the cylindrical body 17 is lifted up again. At this time, the amplitude of engine vibrations is much smaller than that of the idling vibrations. Therefore, the increment in inner pressure of the first fluid chamber A caused by the deformation thereof due to the engine vibrations, can be sufficiently prevented by means of the movable plate 73 of which the movable distance namely the distance between the opposed surfaces 72a, 171a is made short. As a result, engine vibrations can be isolated.

When vibrations of large amplitude such as shake vibrations occur at this time, the increment in inner pressure of the first fluid chamber A cannot be lowered by the movement of the movable plate 73. The fluid flows from the first fluid chamber A to the second portion $B_2$ through the restricted passageway F to generate a large flowing resistance. At this time, a large spring force is also generated due to high inner pressure of the first fluid chamber A. As a result, the vibrations of large amplitude can be damped.

As described above, the elastically damping device of the present invention comprises a partition member for separating the first and second fluid chambers from each other, at least one portion of which is formed into a movable plate, stopping means for stopping the movement of the movable plate and control means for operating the stopping means in accordance with the driving condition of a vehicle.

By changing the movable distance of the movable plate in accordance with the driving condition of the vehicle, the transmission of engine vibrations to the vehicle body can be effectively prevented in all of the driving condition of the vehicle.

What is claimed is:

1. An elastically damping device for the suspension of an engine of a vehicle having driving conditions, comprising:
   a first elastically deformable wall and a second elastically deformable wall which are connected to each other to define a closed enclosure;
   one of said deformable walls being connectable to an engine and being deformable due to vibrations of the engine;
   a partition member dividing said enclosure into a first fluid chamber and a second fluid chamber;
   said first fluid chamber and said second fluid chamber being filled with fluid;
   at least one portion of said partition member being formed into a movable plate which is movable in directions to lower the inner pressure of said fluid chambers;
   a restricted passageway extending through said partition member, said passageway communicating said first and second fluid chambers for flowing therethrough with high flowing resistance the fluid to or from the fluid chamber wherein the volume changes upon receiving engine vibrations;
   means for stopping the movement of said movable plate; and
   control means for moving said stopping means so as to change the movable distance of said movable plate in accordance with a driving condition of the engine.

2. An elastically damping device according to claim 1, wherein each of said first and second deformable walls has a vessel-like shape; and the open ends of said first and second deformable walls are opposed to each other and are connected to a cylindrical side plate, respectively.

3. An elastically damping device according to claim 2, wherein each of said first and second deformable walls is made of a thick rubber elastic body; and said first and second deformable walls are supported by a supporting member so that the distance between the opposed surfaces of said first and second deformable walls which are spaced from each other through said partition member, is maintained constant.

4. An elastically damping device according to claim 2, wherein said first deformable wall is made of a thick rubber elastic body and and is connectable to an engine and said second deformable wall is made of a thin rubber elastic sheet.

5. An elastically damping device according to claim 2, wherein said stopping means has two stopper portions, each of which is opposed to each of the upper and the lower surfaces of said movable plate at a predetermined distance.

6. An elastically damping device according to claim 5, wherein said partition member is composed of one sheet of movable plate; one of said stopper portions is movable in the direction in which the distance between said movable plate and said stopper portion changes; and said control means is an electromagnetic coil which is opposed to said movable stopper portion and attracts said movable stopper portion at an engine starting and operating times.

7. An elastically damping device according to claim 5, wherein said partition member is composed of one sheet of movable plate; said stopper portions are integrally formed, enclose said partition member and are movable to lower the inner pressure of said fluid chambers; and said control means is an electromagnetic coil which is provided in said side plate so as to be opposed to said stopper portions and attracts said stopper portions at an engine starting and operating times while not attracting said stopper portions at an engine idling time.

8. An elastically damping device according to claim 7, wherein said stopper portions is connected to the inner wall of said side plate by means of a deformable connecting member.

9. An elastically damping device according to claim 8, wherein said stopper portions has an annular shape and is disposed along the outer periphery of said movable plate; and said electromagnetic coil has an annular shape and is disposed along said stopper means.

10. An elastically damping device according to claim 9, wherein said electromagnetic coil is supported by the inner surface of said side plate through an elastic body having a predetermined spring constant.

11. An elastically damping device according to claim 4, wherein said partition member is composed of a fixing plate which is fixed to said side plate, and a movable plate which is movable relative to said fixing plate; said passageway is provided in said fixing plate; said second fluid chamber is composed of a first portion defined by said thin rubber elastic sheet and a second portion defined by an elastic sheet which is thicker than said thin elastic sheet and which has a larger elastic force than that of said thin elastic sheet; said first portion is opposed to said movable plate while said second portion is opposed to said fixing plate, and said second portion communicates with said first fluid chamber through said passageway.

12. An elastically damping device according to claim 11, wherein said fixing plate has an annular shape; the outer surface of said fixing plate is fixed to the inner surface of said side plate; said movable plate has a circular shape and is disposed under said fixing plate so that the upper surface of said movable plate covers the open end of said fixing plate; a cylindrical body is coaxially provided under said movable plate; a thin elastic sheet is stretched within said cylindrical body to form said first portion of said second fluid chamber under said movable plate; a thick elastic sheet having larger elastic force than that of said thin elastic sheet is stretched in an annular portion formed between the outer surface of said cylindrical body and the inner surface of said side plate to form said second portion of said second fluid chamber under said fixing plate; and an eccentric shaft of which both ends are supported by said side plate, rotatably penetrates said cylindrical body in its radial direction so that said cylindrical body moves upwardly and downwardly as said shaft rotates.

* * * * *